Feb. 20, 1951 T. M. FERRILL, JR 2,542,018
COMPASS
Filed Sept. 28, 1944 2 Sheets-Sheet 1

INVENTOR
THOMAS M. FERRILL, JR.
BY
Herbert H. Thompson
his ATTORNEY.

Feb. 20, 1951 T. M. FERRILL, JR 2,542,018
COMPASS
Filed Sept. 28, 1944 2 Sheets-Sheet 2
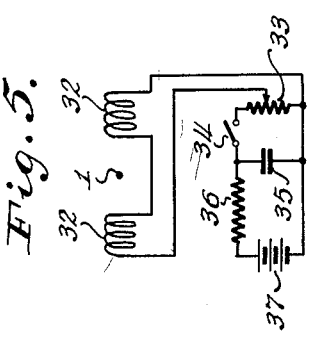
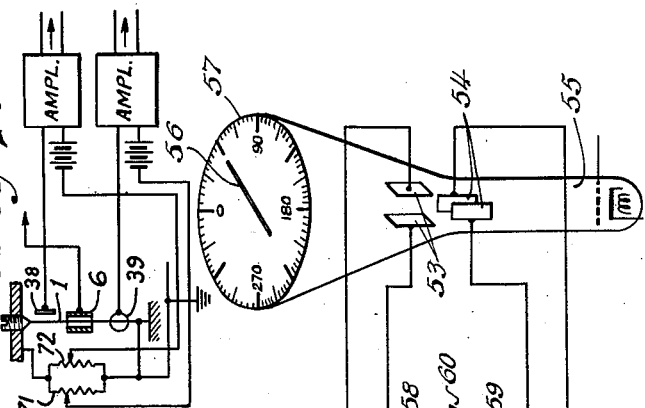
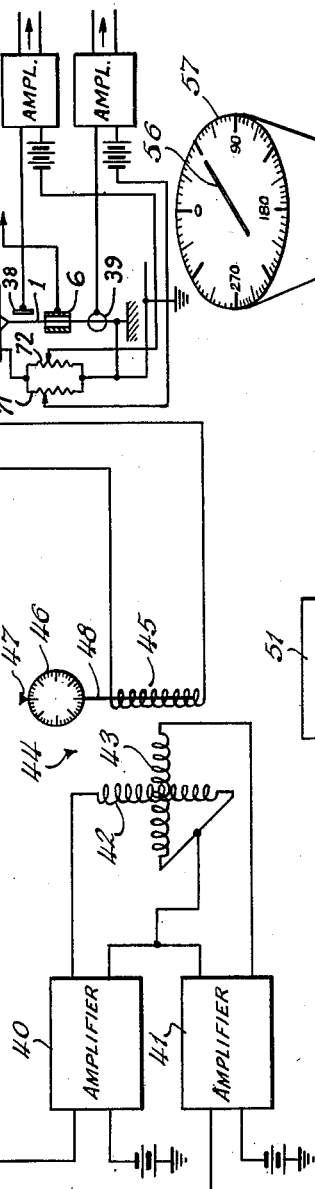
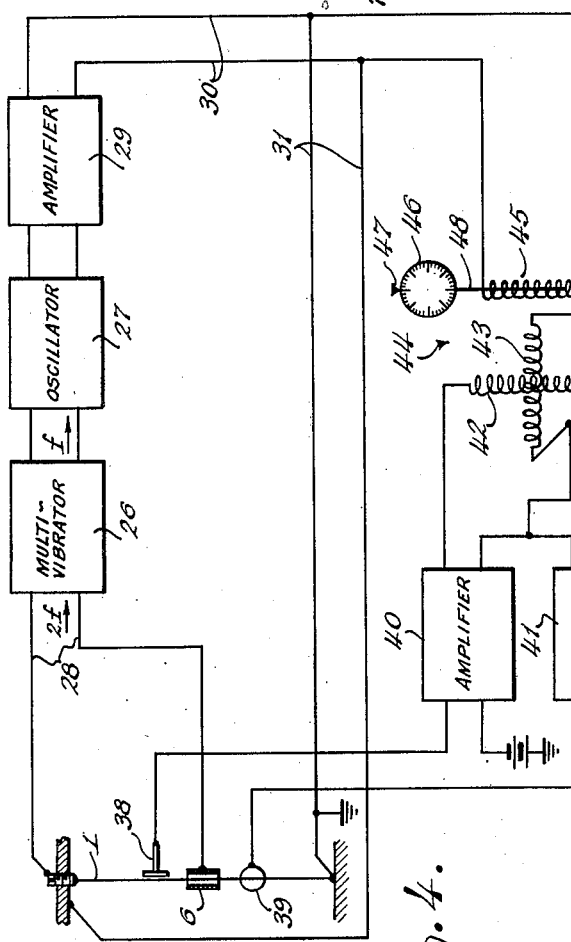
INVENTOR
THOMAS M. FERRILL, JR.
BY
Herbert Thompson
his ATTORNEY Patented Feb. 20, 1951

2,542,018

UNITED STATES PATENT OFFICE 2,542,018

COMPASS

Thomas M. Ferrill, Jr., Hempstead, N. Y., assignor to The Sperry Corporation, a corporation of Delaware Application September 28, 1944, Serial No. 556,186

13 Claims. (Cl. 33—204)

My invention particularly relates to a vibratory-type compass which is adapted for use as the earth's field-sensitive element and transmitter in a remote-reading compass system.

Heretofore, there have been two general types of compass instruments. One of these is the so-called magnetic compass employing a magnetized bar or needle which, being pivotally supported, seeks to align itself with the earth's field. The other type is the so-called earth inductor compass, and under this general heading may be included the more recent flux valve compasses or transmitters. The earlier earth inductors comprise a coil which is rotated in the earth's field to provide a voltage output as a measure of the angle between the direction of the earth's field and some reference on the inductor compass, such as the brushes which engage the commutator thereof. Flux valves embody no rotating parts, but are adapted to supply one or a plurality of signal voltage outputs which are measures of the angular relationship between the direction of the earth's field and certain axes of the flux valve. So-called flux gates, a form of flux valve, employ rotating parts.

From the foregoing, it will be noted that a majority of the prior compasses or compass transmitters embody rotating parts. Such units have a distinct disadvantage in this respect, since it is desirable under many conditions of use to position the earth's field-sensitive element or transmitter of a compass system in some remote, quite often fairly inaccessible location on a craft for improved performance. For this reason alone, the absence of rotating parts in a compass transmitter is greatly desirable.

Another disadvantage of magnetic compasses embodying a magnetized bar or needle resides in the fact that it, in and of itself, has practically no torque output. It is therefore necessary to employ some form of pick-off in connection therewith in order to operate a remote repeater and, of course, the pick-offs and associated repeater system should be of the non-reactive type so that it will not react to produce errors in the transmitter and in the indication of the direction of the magnetic field.

A flux valve has a disadvantage which lies in the fact that its signal voltage outputs contain error voltage components, for example, caused by movements of the craft tilting the flux valve out of horizontal. Turning movements of the craft bearing the flux valve will produce such errors in the valve output, and these, together with any spurious errors as errors of short duration due, for example, to oscillations of the craft or of the valve in its mounting, will appear in the output of the flux valve.

The present invention relates to a novel type of compass which, like the flux valve, embodies no rotating parts and which in its preferred form functions per se as an integrator, whereby turning errors, for example, will not appear in the output thereof unless the duration and rate of turn materially exceed the time constant of the present invention or the period over which it is capable of integrating.

Briefly, the compass of the present invention comprises a vibratory, wire-like element which is supported at two spaced points, preferably at its ends for free vibration, the vibratory element being energized with periodically varying or alternating current of a periodicity or frequency corresponding to the natural vibratory period of the element, whereby, in the absence of any artificial field, the element will seek to vibrate in a plane normal to the earth's field.

Primary objects of the present invention are to provide a novel form of compass or compass transmitter of the character above recited, in which there are no roating parts, but a vibratory element; which is adapted to provide signal voltage outputs and function as a transmitter in a compass system; and which, by virtue of its construction is adapted to be operatively mounted in remote, comparatively inaccessible locations on navigable craft and the like.

It is also a primary object of the present invention to provide a novel form of compass or compass transmitter of the character above pointed out which is so constructed and arranged that the vibratory element thereof will exhibit gyroscopic properties such that it will, per se, function to integrate out errors which would otherwise appear in its output and which are primarily occasioned by transient effects of fairly short duration.

With the foregoing and still other objects in view, my invention includes the novel elements and the combinations and arrangements thereof described below and illustrated in the accompanying drawings, in which—

Fig. 4 is a wiring diagram of one form of compass system of the present invention;

Fig. 5 is a wiring diagram of an electrical starting circuit;

Fig. 6 illustrates, in part, a modified form of the compass system; and

Fig. 7 illustrates a modification of the compass systems of Figs. 4 and 6.

Figure 2:
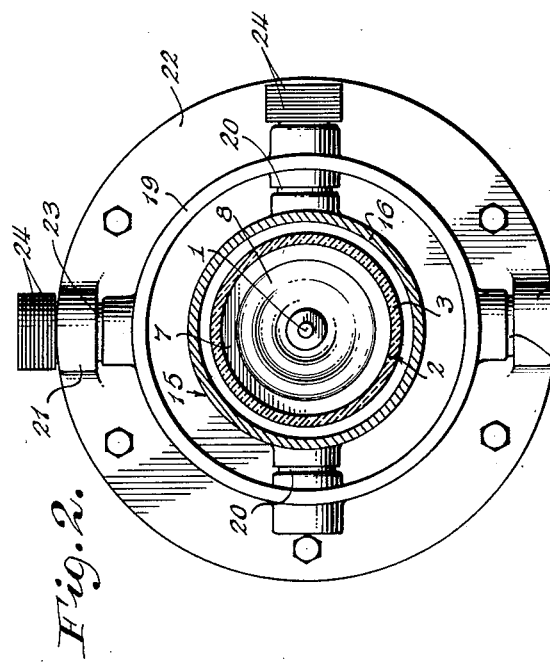
Fig. 2 is a sectional plan view, taken in about the plane 2—2 of Fig. 1.
Figure 3:
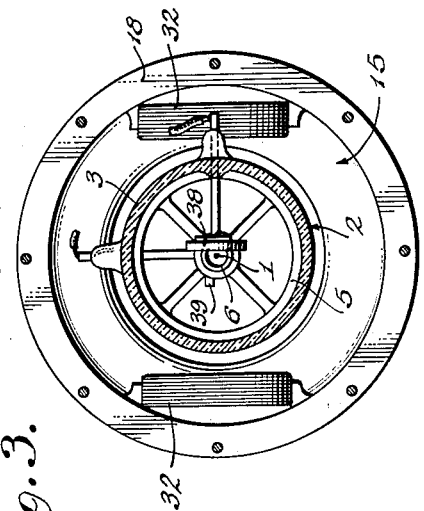
Fig. 3 is a sectional plan view taken in about the plane 3—3 of Fig. 1.
Figure 1:
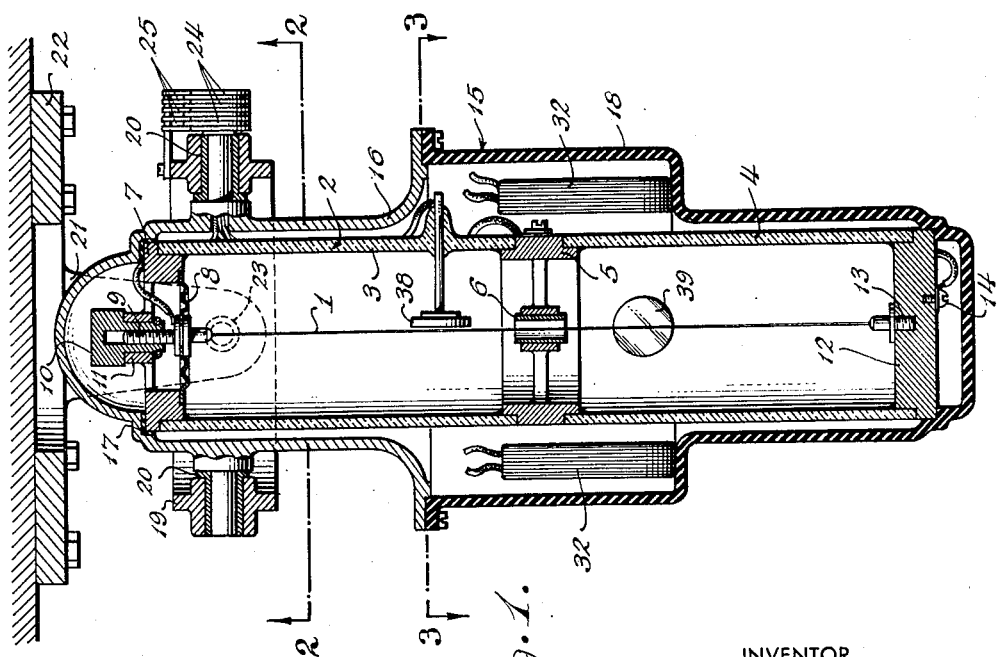
Fig. 1 is a vertical sectional view illustrating a preferred embodiment of the earth's field-sensitive element or the transmitter of the present invention.

Referring first to Fig. 1, wherein I have shown a preferred embodiment of my invention, 1 indicates generally the slender, elongated, wire-like element which is supported at opposite ends to permit free vibration thereof, hereinafter termed a wire for convenience of expression. Certain characteristics of the wire are very important factors to note in considering the present invention. In the first place, we must employ a wire which is an electrical conductor because an alternating or a periodically varying voltage is impressed thereacross sufficient to act as the driving current causing and maintaining vibration in the wire, but insufficient to cause appreciable thermal change in the wire and thereby a change in the natural period thereof. Since the motor field which interacts with the alternating current in the wire to cause vibration thereof is the relatively weak earth's field, the wire should have a relatively high "Q" or quality factor, say, of the order of at least two thousand, in order that a maximum amplitude of vibration may be experienced by the wire for a minimum amount of driving current passing therethrough. The term "Q" is herein used in the same sense as when applied to the "quality" of a resonant circuit. Thus, Q represents the ratio of energy stored in the vibratory element to the energy loss therein per cycle of vibration of the element. In this connection, of course, one limitation on the driving current is the heating effect of the current passing through the wire, as above indicated, and the effect of temperature changes on the wire's free length and hence its change in resonance frequency or natural period.

For azimuthal direction-indicating purposes, the wire-like element of the present invention is preferably normally arranged to extend vertically so that it will vibrate or tend to vibrate in an east-west plane normal to the direction of the horizontal component of the earth's field. We may assume that the earth's horizontal field strength is in the neighborhood of 0.16 gauss (at the latitude of New York). With a field strength of this weak order and a necessary limitation on the driving current supplied to the wire-like element, it is quite obvious that full advantage should be taken of the high "Q" properties of the vibratory element in order that it will operate in the earth's field alone and seek to vibrate in an east-west plane, as above described. For example, I have used a tungsten wire of a length of approximately 7 inches and a diameter of about 0.010 inches. The wire has a fairly high "Q" of not less than two thousand and is tuned to a natural period of about 200 cycles per second.

Where it is desirable that the instrument exhibit gyroscopic properties, a vibratory element having a still higher "Q" than the order of "Q" above indicated should be used; and to provide a time constant of desirable length, the "Q" should be of an order approaching a few hundred thousand or a million. In other words, the element vibrating in an east-west plane will tend to resist any torques or movements of the body on which it is mounted, tending angularly to rotate its plane of vibration in space. To approach these values of "Q," I propose to use a fused quartz strand carrying a conducting layer as the vibratory element and mount it for vibration in an evacuated chamber or partial vacuum. The vibratory element operating under these conditions will experience extremely low energy loss due to internal friction and provide a sufficiently high "Q" and long time constant as to endow the vibratory element with gyroscopic properties. Therefore, with this form of my invention, the system will function in a manner similar to a slaved directional gyro compass system wherein the gyroscope is employed to integrate out errors in the compass system or, from another viewpoint, the directional heading, provided by the gyroscope, is maintained because the gyro is slaved by a compass to maintain the chosen heading.

Therefore, in Fig. 1 I have illustrated the preferred embodiment of my invention wherein the wire 1 of quartz, tungsten or any other suitable material is mounted for free vibration within an envelope indicated generally at 2 which may be at least partially evacuated. In the embodiment illustrated, the envelope 2 comprises two cylindrical elements 3 and 4, which may be formed of glass as indicated, and which are fused in a metal-to-glass weld to a centrally arranged ring 5. Ring 5 serves as the support for a cylindrical capacity pick-off indicated at 6 and hereinafter described. The other end of tube 3 is sealed to an end-plate or closure 7 comprising the diaphragm 8. One end of wire 1 is fastened to diaphragm 8, and movement of this diaphragm for the purpose of adjusting the tension of wire 1 may be effected by means of the threaded shaft 9 which is fastened to the other side of diaphragm 8 and nut 10 which is rotatable in the central hub 11 of closure 7 but restrained from movement axially thereof. The opposite end of the sealed envelope 2 is closed by the cap or closure 12, to which cylinder 4 is fused or welded. Wire 1 may be connected in any suitable manner to the cap 12, for example, as shown, by silver solder to a screw-threaded connector 13 which is anchored within a tapped recess in cap 12, and since the cap 12 may be formed of electrical conducting material, a terminal screw 14 may be threaded in the outer end thereof to permit an electrical connection to be made to this end of the wire. The connection to the other end of the wire may be made as shown to the outer side of the diaphragm 8.

An outer enclosure, indicated generally at 15 for the envelope 2, may be made in two sections as shown and fastened together to provide a support and protective housing for the envelope 2. In the embodiment shown, the upper section 16 of the outer housing is formed of any suitable material and, if of metal, is insulated from the closure 7 by means of a suitable electrical insulating gasket 17. The lower section 18 of the outer housing may be formed of insulating material as shown, in which case it is adapted directly to receive and position the lower end or cap 12 of the inner envelope. Housing 15 is pendulously and universally supported by means of the gimbal ring 19 on which housing 15 is suspended by means of trunnions 20, and ring 19 is rotatably supported in the depending bracket 21 of a support 22 by trunnions 23. The axes of trunnions 21 and 23 are arranged preferably at right angles to each other, and the center of gravity of the unit as a whole lies below the horizontal plane in which these supporting axes lie, whereby to provide a pendulous mount for the vibratory wire, so that the wire will normally lie vertical and will vibrate in a vertical plane. The electrical connections to the wire 1 and its associated pick-offs and to the starting coils, hereinafter described, may be made through suitable slip rings 24 and brushes 25 which are associated with trunnions 20 and 23 as shown.

In accordance with my invention as will appear from the wiring diagram of Fig 4, the periodically varying or alternating current which is supplied as the driving current to wire 1 is derived from any suitable frequency controllable source such as an oscillator, amplifier, and the like. However, for reasons which should be apparent from the foregoing, a close control over the frequency of the output from the oscillator should be exercised in order that the element or wire will be driven continuously to vibrate at resonance. Therefore, I propose to use the wire itself as the primary means for controlling the frequency of the output of the oscillator. To this end, I employ any desired type of pick-off, for example, a capacity-type pick-off as herein illustrated which preferably comprises a cylindrical plate 6, through which the wire 1 extends. Plate 6, as shown in Fig. 4, is connected to a multivibrator 26 which is connected in turn to control an oscillator 27 or any other conventional or suitable type of alternating current generating means. In the arrangement of Fig. 4, the cylinder 6 forms one part of the capacity pick-off while the wire 1, itself, forms the other part, the cylinder and wire being connected to the multivibrator through the conductors 28. Since I preferably employ a cylindrical plate 6 in order that the signal voltage pick-up will take place regardless of the relationship of the plane of vibration of the wire relative thereto, the signal voltage will be of the order of twice the vibrating frequency of the wire. The multivibrator functions to halve the frequency of this signal and supply the half frequency signal in controlling relation to the oscillator. Since the wire will naturally tend to vibrate at resonance, the control signal fed to oscillator 27 will control the oscillator frequency and supply an output having a frequency urging the wire to vibrate at resonance. The output of the oscillator is supplied to an amplifier 29 shown in Fig. 4, which amplifier may be of any conventional or desired construction, and may embody an automatic gain control circuit for controlling the amplitude of the A. C. fed to the wire, limiting it to a desired value at which no appreciable temperature rise in the wire will take place. The output of the amplifier is connected through conductors 30 and 31 to opposite ends of the wire 1 as shown.

The foregoing arrangement effects a control over the oscillator by the wire itself, so that the wire is continuously driven toward vibrating at resonance. For this purpose, the cylindrical condenser pick-off plate 6 is arranged substantially midway between the ends of the wire in order that the plate may respond to the wire in a zone thereof wherein maximum amplitude of vibration exists.

For initial starting purposes, that is, for the purpose of initially starting the wire to vibrate to such an extent that it will seek an east-west plane of vibration and thereafter continue to vibrate in said plane due solely to its energization by the output of the oscillator and associated amplifier, I propose to provide starting coils and a starting circuit of the character shown by way of example in Fig. 5. The starting coils 32 are preferably mounted on opposite sides of the wire 1 and may be supported in the outer casing 15 as shown in Fig. 1. The coils 32 are connected across voltage-dividing resistor 33 which may be connected through the switch 34 across a condenser 35. Condenser 35 is connected in circuit with current-limiting resistor 36 and battery 37. Hence, when switch 34 is closed, a condenser discharge current will be supplied to the starting coils 32, thereby causing vibration to be set up in wire 1. Once the wire has been caused to vibrate, it will tend to orient its plane of vibration into an east-west plane and, since it is connected across the output of the oscillator-amplifier, it will continue to vibrate therein. The switch 34 may be opened immediately after the vibration has been set up in the wire through the energization of the starting coils. Hence, these coils are used only for starting purposes, and no artificial field is employed in the normal operation of the device, the motor action being produced by the periodically varying current in the wire reacting with the earth's magnetic field to cause vibration thereof, as above described.

In the foregoing I have described and in Fig. 1 I have shown a preferred embodiment of my invention wherein the vibratory wire-like element is supported within a partly evacuated chamber. As briefly indicated in the foregoing, I may employ a vibratory element which is of such character that especially when aided by being supported in a partial vacuum it has a sufficiently high "Q" and a sufficiently long time constant as to exhibit gyroscopic properties. It will be understood, of course, that the physical properties of the vibratory element per se, as well as the fact that it is supported in a partial vacuum, both contribute to endowing it with gyroscopic properties.

For example, I propose to use a vibratory element formed of fused quartz, and preferably this strand of quartz is supported in fused quartz supports at both ends thereof. The purpose of employing quartz as a vibratory element and as the supporting material therefor resides in the fact, as hereinbefore pointed out, that this material has extremely low energy loss due to internal friction when stresses are applied thereto, and the loss amounts to only about 1/1000 that of the most favorable metals. The quartz strand may be coated with an extremely thin coating of silver or aluminum or other good current-conducting material which will produce negligible effect on the "Q" of the quartz strand or filament. The quartz filament may have a diameter of the order of about 0.010 inch, or a much smaller diameter and the metallic or conducting coating thereof may be of a thickness order of approximately 0.0001 inch or even thinner.

Employing a quartz filament mounted to vibrate in a partial vacuum as above described, the transmitter or earth's field-sensitive element exhibits gyroscopic properties and operates both as a transmitter and as an integrator or stabilizer when, for example, it is pendulously supported. In other words, if signal voltages derived from the field-sensitive element, as hereinafter described, are supplied to an indicator or repeater, the readings afforded thereby will be integration products similar to the readings afforded by a magnetically slaved directional gyro compass system, wherein both a field-sensitive device and a directional gyro are essential elements to provide the integrated directional indications.

One type of means for deriving signal voltages from the field-sensitive device of Fig. 1 and one manner of connecting these signal voltages to operate an indicator are disclosed in Fig. 4. The signal voltage pick-offs are shown by way of example as of the capacity or condenser type and are indicated at 38 and 39 mounted closely adjacent and in cooperable relation with the wire-like element 1 and with the axes thereof at right angles to each other so that each pick-off is responsive to components of vibration of the wire in planes at 90 degrees to each other. As shown in Fig. 4, the wire itself forms one element of the capacity pick-off while condenser plate 38 is connected to amplifier 40, and condenser 39 is connected to amplifier 41. The outputs of these amplifiers are respectively connected across the field windings 42 and 43 of an induction-type receiver indicated generally at 44. Hence, any component of vibration in the direction of the axis of condenser plate 38 will produce a corresponding voltage across coil 42 while similarly any component of vibration in the direction of the axis of condenser plate 39 will produce a corresponding voltage across the coil 43. These voltage components across the stator field windings of receiver 44 produce a resultant magnetic field which corresponds to the vector sum of the fields of the individual windings. The rotor of repeater 44 comprises winding 45 which is connected across the output of amplifier 29 to receive an exciting voltage which will be of the same frequency as the signal voltages supplied to the stator windings of the receiver. The rotor will therefore be positioned in dependence upon the direction and phase sense of the resultant field of the stator. Graduated compass dial 46, which may rotate relative to a fixed lubber line 47, is mounted to rotate with the rotor shaft 48 of the receiver 44.

It should be clear from the foregoing that the signal voltage components produced from the capacity pick-offs 38 and 39 will produce a resultant field in the stator of repeater 44 which will be oriented or angularly rotated in azimuth relative to the craft on which the system is mounted as the craft moves in azimuth and as the plane of vibration of wire 1 moves relative to the axes of the pick-offs 38 and 39. In other words, since the wire 1 continuously vibrates in an east-west plane, the axis of the resultant field of the stator of repeater 44 will represent a direction which remains fixed in space. Obviously, other types of pick-off devices may be employed as well as other types of repeating or indicating devices.

In Fig. 6 I have shown a modified form of compass system wherein a cathode ray tube is employed as the direction indicator; and for simplicity, I have shown only wire 1 and a pair of condenser-type pick-offs associated therewith and connected with the beam-deflecting means of the tube. The condenser plates 49 and 50 are mounted with their axes at right angles to each other and preferably in close proximity to the wire 1. However, for clearness of illustration, I have shown a considerable space between the wire and the condenser plates. As in Fig. 4, the wire itself functions as one of the parts of the condenser pick-off, and these pick-offs serve to supply voltage outputs, the amplitudes of which are proportional to the component of vibration in planes paralleling or including the axes thereof. Condenser plate 49 is connected to the amplifier 51, and plate 50 is connected to amplifier 52. The outputs of these amplifiers are connected respectively to the pairs of beam-deflecting plates 53 and 54 of the cathode ray tube 55. Hence, the beam of the cathode ray tube will be deflected in accordance with the magnitudes of the voltages appearing on the deflecting plates. The angular position of the linear beam trace, indicated at 56, is measurable on the annular scale 57, and the beam trace will rotate relative to the face of the cathode ray tube in the same manner as the compass card of Fig. 4 will rotate relative to the lubber line 47, the tube providing a 360-degree reading direction indicator.

Since the voltages derived from the pick-offs are of an alternating character, the beam trace will extend to substantially equal distances on opposite sides of the electrical center of the tube and a 180-degree ambiguity in reading will exist. To avoid this ambiguity, I may connect signal voltage rectifying circuits indicated generally at 58 and 59 across the outputs of the respective amplifiers 51 and 52. These rectifiers may be of any well-known phase-sensitive type and the outputs thereof are added in with the alternating voltage signal supplied from the amplifiers. The source of reference voltage supplied to these amplifiers, indicated at 60, is preferably the output of the amplifier supplying the driving current to the wire-like element, such as the amplifier 29 of Fig. 4. This D. C. signal output of the rectifiers, when added to the A. C. signal and supplied to the deflecting plates of the cathode ray tube, serves to apply a bias which shifts the linear beam trace diametrically of the tube in one direction or the other, depending upon the phase-sense of the A. C. signal. Hence, headings or bearings may be determined without ambiguity because of the unequal length of the trace on opposite sides of the electrical center of the tube.

In the foregoing, I have referred to a multivibrator as the device 26 for halving the signal frequency and controlling the oscillator 27. Where a double frequency signal is derived from the pick-up, any suitable frequency halving device may, of course, be employed, such as, for example, a regenerative frequency divider or the like.

Furthermore, if desired, and under some circumstances, means may be provided for balancing out any component of the driving voltage in the signal pick-up systems. A preferred arrangement shown in Fig. 7 consists in connecting the resistance elements 71 and 72 of a pair of potentiometers in parallel with the wire 1, the slide contacts of the potentiometers being respectively connected to one side of the input to the amplifiers 40, 41 or 51, 52. Adjustment of the slide contacts of the potentiometers serve to place the cooperable pick-off parts at zero potential difference so far as the driving voltage is concerned and therefore no component of driving voltage will be present in the input to the signal voltage amplifiers.

From the foregoing description of the present invention, it should be understood that I have provided a field-sensitive element having no rotating parts which is adapted for positioning in remote and fairly inaccessible locations, and which is inherently adapted to permit the ready pick-off of signals therefrom for receivers or compass repeater operating purposes. Furthermore, I have provided a field-sensitive element of the foregoing character which is so constructed and arranged that, at moderate frequency and with its high "Q," the vibratory momentum thereof will enable it to function as an integrator. Hence, for example, when the sensitive element is pendulously supported, only extremely small turn errors will at the most be produced.

While I have described my invention in its preferred embodiments, it is to be understood that the words which I have used are words of description rather than of limitation and that changes within the purview of the appended claims may be made without departing from the true scope and spirit of my invention in its broader aspects.

What is claimed is:

1. Apparatus for providing a directional indication comprising supporting means, an extremely fine, elongated, wire-like element having a high Q and supported adjacent its ends in said supporting means in a manner to permit free vibration thereof and to exhibit a high Q, the areas laterally surrounding said wire-like element over substantially its entire length being of substantially uniform permeability and free of magnetic material causing directional distortion of the earth's field in the zone wherein said wire-like element reacts therewith, and means consisting of a source of periodically varying current having a periodicity corresponding to the natural period of said element and connected to energize said element for causing said element through interaction with the earth's field to vibrate in a planar mode and at its natural period whereby to endow said element with sufficient directional energy as to maintain the plane of vibration substantially fixed in space and uninfluenced by rotation of said supporting means about said element.

2. Apparatus for providing a directional indication comprising supporting means, an extremely fine, elongated, wire-like element having a high Q and supported adjacent its ends in said supporting means in a manner to permit free vibration thereof and to exhibit a high Q, the areas laterally surrounding said wire-like element over substantially its entire length being of substantially uniform permeability and free of magnetic material causing directional distortion of the earth's field in the zone wherein said wire-like element reacts therewith, means consisting of a source of single phase alternating current connected to energize said element to cause it to react with the earth's field and maintain a vibration thereof in a planar mode and at its natural period, whereby to endow said element with sufficient directional energy as to maintain the plane of vibration substantially fixed in space and uninfluenced by rotation of said supporting means about said element, and means for indicating the direction of the plane of vibration of said element.

3. The combination recited in claim 2 including means for controlling the frequency of the single phase current to substantially equal the natural period of said wire-like element.

4. In an earth's field-sensitive compass of the character described, an elongated wire-like element, a supporting means for said element having spaced apart portions between which said element is supported in a manner to permit free vibration thereof, driving means consisting of a source of periodically varying current having a periodicity corresponding to the natural period of said element connected to energize said element and maintain it in vibration through interaction with the earth's field, the areas laterally surrounding said wire-like element over substantially its entire length being of substantially uniform permeability and free of magnetic material causing directional distortion of the earth's field in the zone wherein said wire-like element reacts therewith whereby to provide for the presence of the earth's field about said element substantially undistorted in direction so that said element will vibrate in a plane substantially fixed in space and normal to the direction of the component of the earth's field lying perpendicular to said element for all positions of said supporting means throughout 360° of rotation thereof about said element as an axis.

5. In an earth's field-sensitive compass of the character described comprising an elongated wire-like element, a supporting means for said element having spaced apart portions between which said element is supported in a manner to permit free vibration thereof, driving means consisting of a source of periodically varying current having a periodicity corresponding to the natural period of said element connected to energize said element and maintain it in vibration through interaction with the earth's field, the areas laterally surrounding said wire-like element over substantially its entire length being of substantially uniform permeability and free of magnetic material causing directional distortion of the earth's field in the zone wherein said wire-like element reacts therewith whereby to provide for the presence of the earth's field about said element substantially undistorted in direction so that said element will vibrate in a plane substantially fixed in space and normal to the direction of the component of the earth's field lying perpendicular to said element for all positions of said supporting means throughout 360° of rotation thereof about said element as an axis, and means including electrical pick-off means associated with said element for indicating the direction of the earth's field.

6. In an earth's field-sensitive compass of the character described, an extremely fine, elongated, wire-like, electrical conducting element adapted to exhibit a relatively high Q, a supporting means for said element having spaced apart portions between which said element is supported in a manner to permit free vibration thereof and to exhibit a high Q, said supporting means including a closed envelope within which said wire-like element is operatively disposed, driving means consisting of a source of periodically varying current having a periodicity corresponding to the natural period of said element connected to energize said element and maintain it in vibration through interaction with the earth's field, the areas laterally surrounding said wire-like element over substantially its entire length being of substantially uniform permeability and free of magnetic material causing directional distortion of the earth's field in the zone wherein said wire-like element reacts therewith whereby to provide for the presence of the earth's field about said element substantially undistorted in direction so that said element will vibrate in a plane substantially fixed in space and normal to the direction of the component of said field lying perpendicular to said element for all positions of said supporting means throughout 360° of rotation thereof about said element as an axis.

7. An earth's field-sensitive compass of the character described comprising an extremely fine, elongated, wire-like, electrical conducting element adapted to exhibit a relatively high Q, a supporting means for said element having spaced apart portions between which said element is supported in a manner to permit free vibration thereof and to exhibit a high Q, said supporting means including a closed envelope within which said wire-like element is operatively disposed, driving means consisting of a source of periodically varying current having a periodicity corresponding to the natural period of said element connected to energize said element and maintain it in vibration through interaction with the earth's field, the areas laterally surrounding said wire-like element over substantially its entire length being of substantially uniform permeability and free of magnetic material causing directional distortion of the earth's field in the zone wherein said wire-like element reacts therewith whereby to provide for the presence of the earth's field about said element substantially undistorted in direction so that said element will vibrate in a plane substantially fixed in space and normal to the direction of the component of said field lying perpendicular to said element for all positions of said supporting means throughout 360° of rotation thereof about said element as an axis, and means including electrical pick-off means associated with said element for indicating the direction of the earth's field.

8. In an earth's field-sensitive compass of the character described, an elongated, wire-like element, supporting means for said element having spaced apart portions between which said element is supported in a manner to permit free vibration thereof, driving means consisting of a source of periodically varying current having a periodicity corresponding to the natural period of said element connected to energize said element and maintain it in vibration through interaction with the earth's field, the areas laterally surrounding said wire-like element over substantially its entire length being of substantially uniform permeability and free of magnetic material causing directional distortion of the earth's field in the zone wherein said wire-like element reacts therewith whereby to provide for the presence of the earth's field about said element substantially undistorted in direction so that said element will vibrate in a plane substantially fixed in space and normal to the direction of the component of said field lying perpendicular to said element for all positions of said supporting means throughout 360° of rotation thereof about said element as an axis, and means including pick-off means responsive to said element for controlling the frequency of the current supplied thereto.

9. An earth's field-sensitive compass of the character described comprising an elongated, wire-like element, supporting means for said element having spaced apart portions between which said element is supported in a manner to permit free vibration thereof, driving means consisting of an oscillator adapted to supply periodically varying current having a periodicity corresponding to the natural period of said element and connected to energize said element and maintain it in vibration through interaction with the earth's field, the areas laterally surrounding said wire-like element over substantially its entire length being of substantially uniform permeability and free of magnetic material causing directional distortion of the earth's field in the zone wherein said wire-like element reacts therewith whereby to provide for the presence of the earth's field about said element substantially undistorted in direction so that said element will vibrate in a plane substantially fixed in space and normal to the direction of the component of said field lying perpendicular to said element for all positions of said supporting means throughout 360° of rotation thereof about said element as an axis, means including electrical pick-off means associated with said element for indicating the direction of the earth's field, means associated with said wire-like element for producing a signal dependent upon the vibration of said element, and means for applying said signal to said oscillator to control the phase and frequency of the output of said oscillator.

10. An earth's field-sensitive compass instrument of the character recited in claim 9 in which the means for producing the oscillator-controlling signal comprises a capacity pick-off surrounding said wire-like element.

11. An earth's field-sensitive compass of the character described comprising an elongated wire-like element, supporting means for said element having spaced apart portions between which said element is supported in a manner to permit free vibration thereof, driving means consisting of a source of periodically varying current having a periodicity corresponding to the natural period of said element connected to energize said element and maintain it in vibration through interaction with the earth's field, the areas laterally surrounding said wire-like element over substantially its entire length being of substantially uniform permeability and free of magnetic material causing directional distortion of the earth's field in the zone wherein said wire-like element reacts therewith whereby to provide for the presence of the earth's field about said element substantially undistorted in direction so that said element will vibrate in a plane substantially fixed in space and normal to the direction of the component of said field lying perpendicular to said element for all positions of said supporting means throughout 360° of rotation thereof about said element as an axis, means associated with said element for producing a signal dependent upon the vibration of said element and means for applying said signal to said source to control the phase and frequency of the output of said source, a pair of pick-offs relatively spaced about said element and each adapted to provide a signal voltage dependent upon the plane of vibration of said element relative thereto, and means responsive to said signal voltages for indicating the direction of the earth's field.

12. A compass instrument of the character recited in claim 11, in which the means for providing directional indications comprises a stator and rotor, the rotor having a winding energized from said current source and the stator comprising a pair of windings relatively positioned in correspondence with the relative positions of said pick-offs and respectively connected for control by the signal voltages derived from the correspondingly positioned pick-off.

13. A compass instrument of the character recited in claim 11, in which the means for providing directional indications comprises a cathode ray tube having a pair of beam deflecting means relatively positioned in correspondence with the relative positions of said pick-offs and connected respectively for control by the signal voltages derived from the correspondingly positioned pick-off.

THOMAS M. FERRILL, JR.

REFERENCES CITED

The following references are of record in the file of this patent:

UNITED STATES PATENTS

| Number | Name | Date |
|---|---|---|
| 1,863,415 | Rieber | June 14, 1932 |
| 2,038,059 | Reichel et al. | Apr. 21, 1936 |
| 2,178,252 | Forster | Oct. 31, 1939 |
| 2,249,649 | Fielding | July 15, 1941 |
| 2,309,853 | Lyman et al. | Feb. 2, 1943 |
| Re. 22,409 | Lyman et al. | Dec. 21, 1943 |
| 2,373,096 | Bonell | Apr. 10, 1945 |